July 18, 1967

I. V. K. HOTT 3,331,470

TWO-POST FRAME CONTACT LIFT

Filed Feb. 7, 1966

INVENTOR
Ion V. K. Hott
BY

July 18, 1967  I. V. K. HOTT  3,331,470
TWO-POST FRAME CONTACT LIFT
Filed Feb. 7, 1966 2 Sheets-Sheet 2
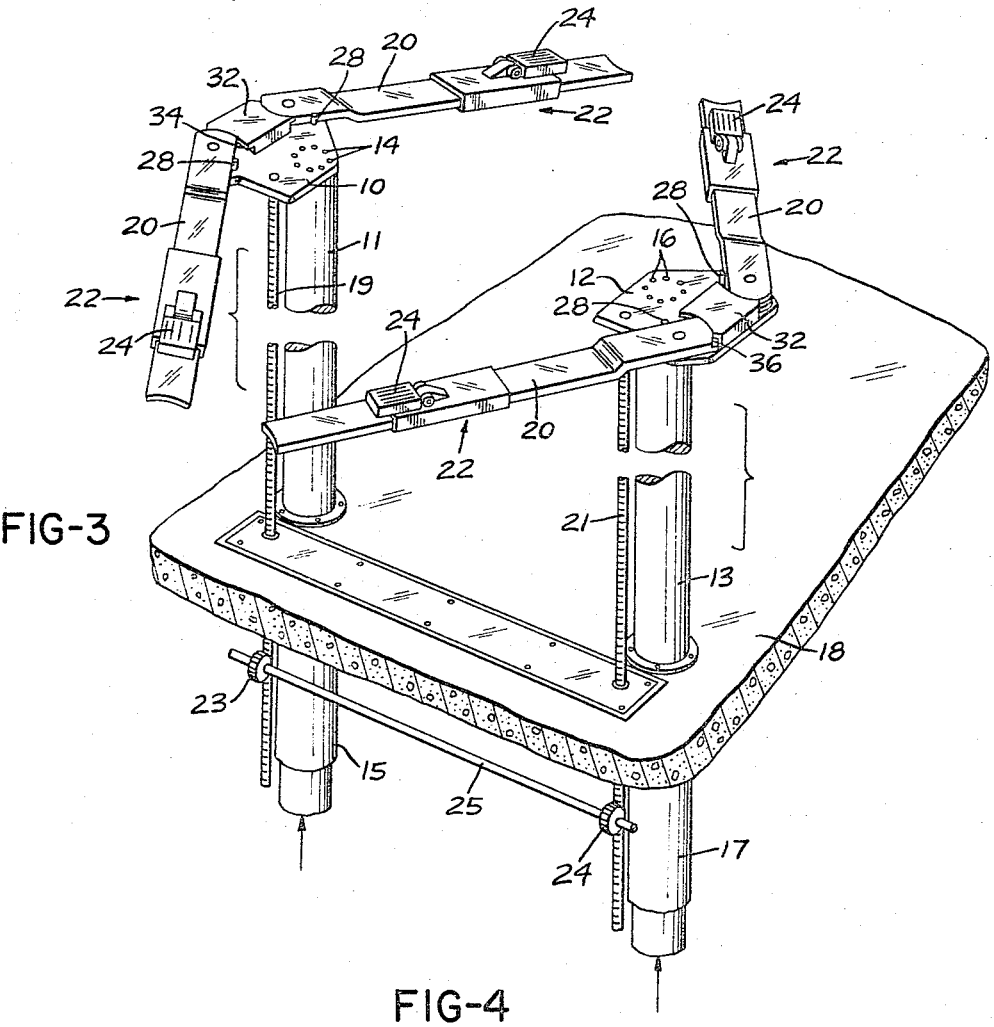

United States Patent Office 3,331,470
Patented July 18, 1967

3,331,470
TWO-POST FRAME CONTACT LIFT
Ion V. K. Hott, 216 Harman Blvd.,
Dayton, Ohio 45419
Filed Feb. 7, 1966, Ser. No. 525,390
2 Claims. (Cl. 187—8.75)

This invention relates to lifts or hoists for vehicles such as passenger cars and trucks and is particularly concerned with a hoist of this nature which is substantially universally applicable to all types of passenger vehicles and at least small trucks.

Automobile lifts or hoists are, of course, known and are employed in filling stations and garages for elevating vehicles to gain access to lower parts of the vehicle such as the brakes or the underneath side of the vehicle for the purpose of lubrication or repair or other work operations.

The usual hoist is in the form of a sort of platform or superstructure disposed directly on top of the floor and over which the vehicle is placed prior to being elevated. After the vehicle is positioned over the platform, power means such as fluid operated rams are employed for moving the platform vertically whereby the vehicle will be elevated to the desired height.

Most platforms or superstructures of this nature embody elements that can be adjusted so as to engage portions of the bottom part of the vehicle, the chassis, for example, which will withstand the lifting force without damage and which will securely support the vehicle. Inasmuch as vehicles will vary widely with respect to size and the design of the underneath part which is engaged by the lift platform, the lift platform or superstructure embodies elements which can be shifted in position, and sometimes adjusted with respect to height in order to engage the vehicle in a proper manner.

Some vehicles are provided with substantially conventional chassis members positioned inwardly from the sides of the vehicle and extending longitudinally thereof which are engaged by the superstructure of the lift mechanism.

In other cases, the chassis is in the form of a sort of X frame with arms radiating outwardly from about the middle of the vehicle. In still other cases, the vehicle body itself forms the chassis and in this case engagement must be made with the vehicle body closely adjacent the sides thereof.

Some vehicles have considerable clearance above the floor and will thereby pass easily over the superstructure of the lift mechanism while other vehicles, particularly short sports type vehicles, may have a relatively low clearance and sometimes it is the case that such vehicles will not pass over the usual superstructure of a lift mechanism.

Still other variables encountered in connection with vehicles is the lateral spacing of the wheels. More recently, with the increase in the manufacture of small compact vehicles and with considerable influx of foreign vehicles, it has been found that many conventional vehicle hoists are incapable of handling these vehicles properly because the wheel spacing of the vehicle does not permit them to be driven readily over the superstructure of the hoist mechanism.

With the foregoing in mind, it is a primary object of the present invention to provide a vehicle lift or hoist mechanism having a superstructure so arranged that substantially any type of vehicle or small truck can be positioned over the superstructure for being lifted thereby.

Another particular object of the present invention is the provision of a hoist mechanism having a superstructure so arranged that vehicles with minimum road clearance can readily be handled by the hoist mechanism.

A still further object of the present invention is the provision of a superstructure arrangement for a hoist mechanism which can readily handle vehicles of any size or of any lateral wheel spacing or of any road clearance with the minimum amount of adjustment on the said superstructure.

Still a further object of the present invention is the provision of a superstructure for a hoist mechanism in which the superstructure offers no interference to the movement thereover of any vehicle to be lifted thereon but in which no loss of strength of the superstructure results so that the resulting hoist mechanism has fully as much capacity as any hoist mechanism of the prior art.

The several objects referred to above as well as still other objects and advantages of the present invention will become more apparent upon reference to the following specification taken in connection with the accompanying drawings in which:

FIGURE 3 is a view like FIGURE 1 but shows more of the hoist structure and illustrates the hoist structure in elevated position;

FIGURE 4 is a transverse sectional view indicated by line IV—IV on FIGURE 1; and FIGURE 5 is a plan view illustrating somewhat more in detail adjustable lift pads that are carried by the lift arms of the superstructure.

Figure 1:
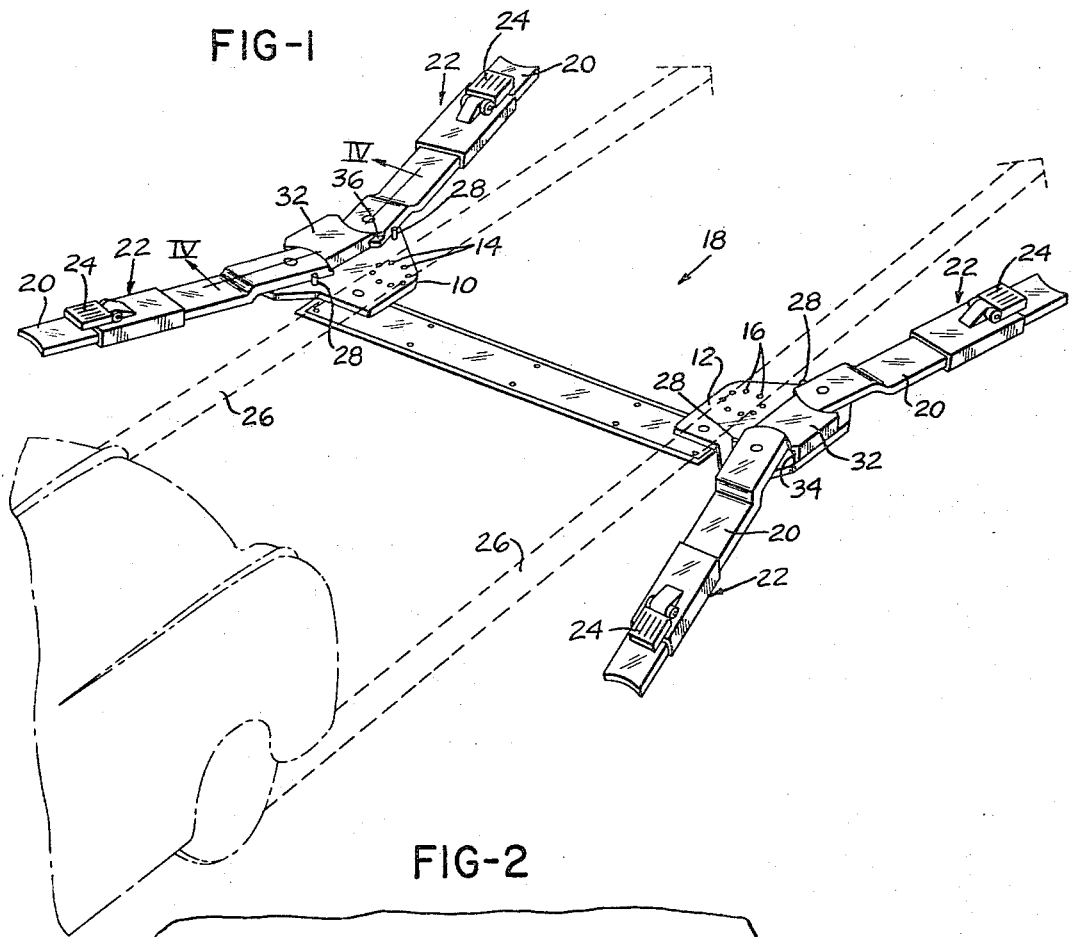
FIGURE 1 is a somewhat diagrammatic perspective view showing a vehicle lift on a hoist mechanism according to the present invention with the superstructure thereof adjusted into position for a vehicle to be driven into lift position thereover.

Hoist mechanisms or vehicle lifts of the nature with which the present invention is concerned comprise one or a pair of vertically moveable rams, generally actuated by fluid pressure, for example, oil under pressure, and extending vertically downwardly into a floor. Resting on top of the floor, or near the floor level, and connected to the upper end or ends of the fluid operated ram means is a superstructure or vehicle support means which, in the case of a single ram is a single integral unit, whereas, in the case of a pair of rams, may be in the form of an individual unit attached to each of the separate rams.

In any case, the superstructure is raised vertically when the ram means are raised vertically. The superstructure embodies devices for engaging the underneath side of a vehicle. In modern devices of this nature, the superstructure comprises one or more bolsters and pivotally mounted on the bolsters for swinging movement in a direction parallel to the floor are lift arms so that after a vehicle has been positioned properly over the superstructure, the lift arms can be swung into the proper position to engage the understructure of the vehicle at the proper points so that subsequent vertical movement of the superstructure will lift the vehicle. These arms may embody structures slidable thereon and having tiltable pad elements embodied therein for effecting the best engagement with the vehicle understructure while leaving the parts thereon to be worked or exposed. For proper positioning of the vehicle, the lift installation usually includes a wheel locator plate on the floor to position one of the vehicle wheels.

It has heretofore been the case that such superstructure arrangements of the vehicle lifts have been disposed toward the center of the path taken by the vehicle in driving into position over the superstructure, which is to say, as the vehicle is driven over the vehicle lift, the superstructure of the vehicle lift, including the lift arms, is disposed between the wheels of the vehicle. This has led to the construction of the superstructure to be as shallow in the vertical direction as possible to permit low slung vehicles to pass thereover. Even the most compact construction of the superstructure of the lift however will raise some questions of clearance over extremely low slung vehicles and especially vehicles of a relatively narrow gauge wherein the wheels are spaced laterally a shorter distance than with conventional vehicles. With vehicles having the wheels relatively close together, parts pertaining to the wheels and located adjacent thereto on the vehicle, such as brake drum or shock absorber arms and the like, might strike on the vehicle lift superstructure as the vehicle passes thereover.

The present invention proposes to arrange the superstructure of the vehicle lift in such a manner that practically any vehicle can be moved into position over the vehicle lift superstructure without any danger at all of the vehicle striking on the superstructure parts. This is accomplished by positioning the principal parts of the superstructure outside the lateral range of the wheels of any vehicle to be driven thereon, so that after the vehicle is in position over the vehicle lift, the lift arms of the vehicle lift can be swung inwardly from the outside into position to effect engagement with the vehicle understructure.

It has been found that the positioning of the swingable support arms outside the lateral range of the vehicles positions the swinging lift arms so that they can readily be manipulated into the proper position without reaching under the vehicle to get hold of the arms. Furthermore, the mechanism loses no strength because of this positioning of the lift arms.

Furthermore, with the bolsters to which the lift arms are pivotally connected disposed laterally outside the range of the understructure of the vehicle, the maximum amount of the vehicle understructure is exposed for carrying out whatever operations are to be performed on that part of the pertaining vehicle, and the entire central region beneath the vehicle is open space.

According to the present invention the two ram type vehicle lift is preferred with each ram having a pertaining individual bolster plate and each bolster plate having a pair of lift arms pivoted thereto so that the space between the rams is left entirely open and free of any obstructions whatsoever which is, of course, of benefit in driving low slung vehicles into position over the vehicle hoist and is also of substantial benefit during work operations on the understructure of the vehicle.

Referring to the drawings somewhat more in detail, in FIGURE 1, 10 and 12 are bolsters which are connected by bolt means 14 and 16 to the upper ends of rams which extend vertically downwardly into the floor which is designated 18. Each bolster has pivoted thereto a pair of lift arms 20 which can be swung about their pivotal connections with the respective bolsters inwardly and outwardly as will best be seen in FIGURES 2 and 3.

Each lift arm has a pad structure 22 slidable thereon and each pad structure includes at least one tiltable pad member 24. The pad members can be left in their lowered position, in which they are illustrated in the drawings, or can be tilted up 90° from their lowered position so as to be engageable with regions of the understructure of the vehicle to be lifted.

As will be seen in FIGURE 1, bolsters 10 and 12 are so arranged that the paths 26 along which the wheels of the widest vehicle to be lifted will travel pass over the said bolsters. With narrower vehicles, of course, the wheel paths might actually be inside the bolsters. It will also be seen in FIGURE 1 that the lift arms 20 and the pads supported thereon are swung outwardly away from the path of the vehicles so that there is absolutely no obstruction to the path of the vehicle of any size into the proper position relative to the lift.

Figure 2:
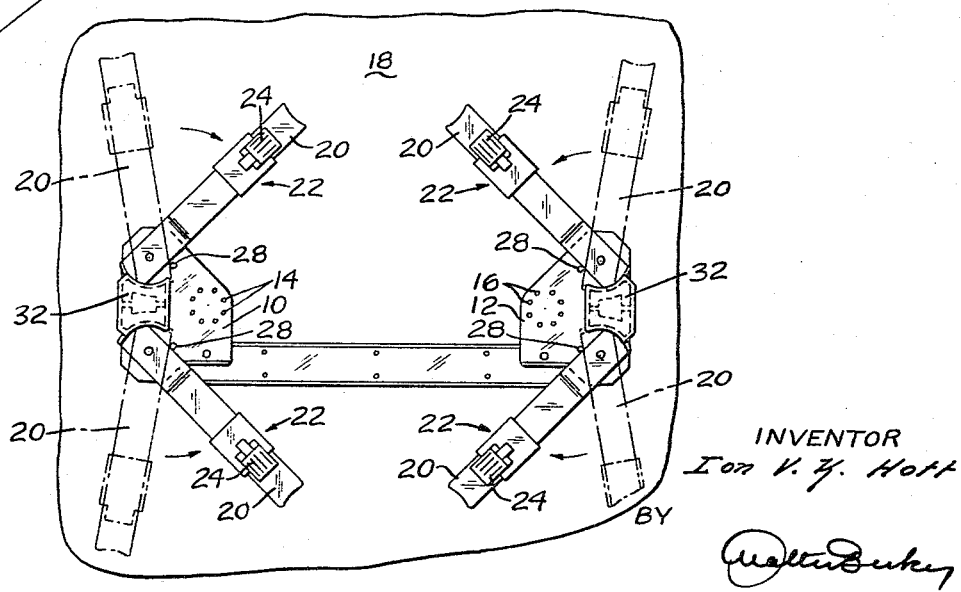
FIGURE 2 is a somewhat schematic plan view showing the manner in which the lift arms of the superstructure can be swung inwardly so as to be positioned beneath the vehicle to be lifted thereby.

FIGURE 2 shows the lift arms 20 swung inwardly and it will be observed that the innermost position of the said arms can be determined by the stop pins 28 carried by the bolsters if so desired.

FIGURE 3 is a perspective view showing the lift arms swung inwardly and the lift in elevated position. In this view it will be noted that bolster 10 is connected to the upper end of a ram 11. The rams or posts 11, 13 extend downwardly into floor 18 and into respective cylinders 15 and 17.

Since two rams are provided it is desirable for the movement of the rams to be synchronized and for this purpose each bolster 10 and 12 has a respective rack 21, 19 secured thereto and extending downwardly into floor 18 in a direction parallel to the axes of the respective rams. Below the floor, racks 21 and 19 mesh with pinions 23 and 24 which are fixed to a transverse shaft 25. By this simple synchronizing arrangement the rams are constrained to move at the same speed in their upward and downward directions so that the bolsters and the lift arms pivotally connected thereto are always at the same height.

The construction of one of the bolsters is indicated in FIGURE 4 which is a section taken through bolster 10. In this view it will be noted that the bolster comprises a substantial lower plate portion 30 and fixed to the top thereof, as by welding or the like, is another plate portion 32 and which two plate portions define a pair of arcuate slots 34 into which lips 36 on the inner ends of the lift arms 20 extend. The lift arms are pivotally connected with plate 30 as by pivots 38 which somewhat loosely retain the lift arms in place so that when the lift arms are loaded, the lips 36 thereof will engage the upper surfaces of slot 34 and thereby hold the lift arms against pivotal movement on its respective bolsters.

The lift pads 22 somewhat schematically illustrated in FIGURES 1, 2 and 3 may be constructed as shown in FIGURE 5 wherein the lift pads shown therein comprises a frame part 40 slidable longitudinally to any desired position along lift arm 22 and on which frame is pivoted, by means of pivot 42, a bracket 44. Pivoted to bracket 44 by pivot means 46 is a smaller step portion 48 forming a first pad element which can be tilted upwardly from a horizontal position so as to provide a first elevation of the pad, and a second somewhat larger pad element 50 also pivotal about pivot 46, and which can be tilted up to a vertical position to provide a second degree of elevation of the superstructure. By means of the tiltable lift pads referred to the absolute maximum amount of area of the understructure of the vehicle will be accessible for work so substantially any work operations can be performed on the vehicle by availing of the aforementioned lift pads and positioning the lift pads under portions of the understructure of the vehicle which is different from that which is to be worked on, or is remote therefrom.

From the foregoing it will be appreciated that the novel lift structure of the present invention provides for a vehicle lift that is substantially completely universal with respect to all sizes of cars with all degrees of road clearance and all types of chassis or frames, and that the arrangement of the present invention positions the lift arms in such a manner that they can easily be manipulated from outside the limits of the vehicle thereby eliminating the necessity of the attendant from reaching beneath the vehicle to position the lift arms relative to the vehicle prior to lifting, and that the arrangement is of such a nature that no structural strength is sacrificed in order to obtain the advantages referred to.

It will be understood that this invention is susceptible to modification in order to adapt it to different usages and conditions; and accordingly, it is desired to comprehend such modifications within this invention as may fall within the scope of the appended claims.

What I claim is:

1. A vehicle lift structure which includes: power operable ram means movable upwardly in a vertical direction from floor level, two horizontal bolster plates spaced from each other and respectively having inner portions facing each other and fixedly connected to the tops of said ram means, said bolster plates also respectively having outer portions facing away from each other and protruding outwardly beyond said ram means, two pairs of load-supporting arms respectively supported on the top surface of said bolster plates, each of said pairs having a forwardly and a rearwardly extending arm, and two pairs of pivot bolts, said pairs of bolts extending through and being respectively supported by said outwardly protruding outer portions of said bolster plates and pivotally connecting the arms of the respective adjacent pair of arms to the respective bolster plates so that the spacing between the pivotal connection of said pairs of arms with said outer portions of said bolster plates is greater than the fixed connection of said inner portions of said bolster plates with said ram means, so that said structure may accommodate vehicles having tread-widths as great as the distance between the connections of said supporting arms to said bolster plates.

2. A vehicle lift structure according to claim 1, in which said ram means includes two posts respectively having said bolster plates connected thereto, and in which the longitudinal axes of said two posts are spaced from each other by a distance less than the spacing between the pivotal connection of said pairs of arms with the respective bolster plates pertaining thereto.

References Cited

UNITED STATES PATENTS 2,593,635  4/1952  Walker _____ 187—8.75
3,243,015  3/1966  Swick _____ 187—8.75

EVON C. BLUNK, *Primary Examiner.*

H. C. HORNSBY, *Assistant Examiner.*